United States Patent
Cornacchia

[11] 3,819,228
[45] June 25, 1974

[54] INTERLOCKING DEVICE FOR AUTOMOBILE DOORS

[75] Inventor: Felice Cornacchia, Turin, Italy

[73] Assignee: Fiat Societa per Azioni, Turin, Italy

[22] Filed: Nov. 16, 1972

[21] Appl. No.: 307,256

[30] Foreign Application Priority Data
Nov. 19, 1971 Italy.................................. 70792/71

[52] U.S. Cl............ 296/146, 180/112, 292/DIG. 65
[51] Int. Cl........................... B60j 5/04, B60r 21/02
[58] Field of Search ............ 296/146; 180/111, 112, 180/113; 49/467, 470; 292/DIG. 39, DIG. 40, DIG. 65, DIG. 73

[56] References Cited
UNITED STATES PATENTS

| | | | |
|---|---|---|---|
| 1,580,722 | 4/1926 | Greathouse........................ | 180/113 |
| 2,010,625 | 8/1935 | Daste................................. | 296/146 |
| 2,080,714 | 5/1937 | Hicks et al......................... | 296/146 |
| 2,549,284 | 4/1951 | Baker................................. | 49/470 X |
| 2,815,085 | 12/1957 | Whipple............................. | 180/113 |
| 2,941,614 | 6/1960 | Forbush et al..................... | 180/113 |
| 3,289,782 | 12/1966 | Price................................. | 180/112 X |

Primary Examiner—Robert G. Sheridan
Assistant Examiner—Leslie J. Paperner
Attorney, Agent, or Firm—Sughrue, Rothwell, Mion, Zinn & Macpeak

[57] ABSTRACT

This invention provides improved collision-resisting structure for withstanding side impacts on automobile doors. The door and the door sill have interengageable elements which become coupled together upon initial deformation of the door when subjected to a side impact, preventing upward and inward deformation of the door panel by effectively locking the bottom edge of the door to the sill.

1 Claim, 3 Drawing Figures

INTERLOCKING DEVICE FOR AUTOMOBILE DOORS

BACKGROUND OF THE INVENTION

This invention relates to automobile bodies of the type provided on the sides with one or more doors each hinged about a substantially vertical axis.

An object of the invention is to increase the safety of passengers of automobiles having the abovementioned type of body in the event of side collisions and, in particular, at reducing considerably the risk of passengers being crushed inside an automobile which has been subjected to a lateral collision in the vicinity of a door.

Studies in road safety have shown that in a serious road crash it is essential to ensure that the space occupied by the occupants of an automobile should not be reduced below a certain minimum in order to reduce the likelihood of injury. For this purpose structures of differential impact resistance have been developed, which are effective in the event of a frontal collision. The problem of resisting lateral collisions is, however, more difficult to solve satisfactorily.

The solution adopted until now has been that of reinforcing each side door with an internal structure extending between the hinges and the free edge of the door. The side supports of the door space have, however, been found to have insufficient resistance and have had to be reinforced: in this way a chain of successive reinforcements can be suggested, which are in practice relatively inefficient and highly expensive.

From an analysis of the deformations which occur in a car body when it is subjected to a side collision, conducted through repeated experimental crashes, the Applicant has found that the deformation of a door towards the interior of a car body in the event of a side collision was consistently followed by a considerable deformation of the lower edge of the door, which deflected upwards, while the sill beneath the door was deformed much less.

SUMMARY OF THE INVENTION

The present invention accordingly provides a side-collision resisting structure comprising at least two cooperating interengageable elements carried respectively by the lower edge of the door, substantially equidistantly from the ends of said edge, and by said sill bar; said interengageable elements being adapted to cooperate in the closed position of the door to prevent substantial relative displacement of said elements both in the vertically upward and in the horizontally inward direction with respect to the car body under the action of collision forces applied to the outside surface of the door.

Experience has shown that in an improved car body according to this invention the deformations of the doors in the event of side collision are highly reduced and the resistance of the doors to deformations towards the inside of the car body (which could, when certain limits are exceeded, even result in the penetration of the door into the car interior), is increased and is in consequence much higher than that of vehicle doors provided with an internal reinforcement of the known type referred to above.

This invention therefore provides a very efficient solution to the side impact problem, at low cost, due to the structural simplicity of the interengaging elements used, and to the fact that they do not require precision manufacture.

In fact, for the purpose of this invention it is sufficient that effective coupling between the two interengageable elements of the or each pair occurs only after the door has already suffered a perceptible deformation; under normal conditions of use of the vehicle a certain amount of play is allowed in the two directions referred to above between the surfaces of the two elements which cooperate as a result of deformation of the door.

The use of interengageable elements affixed to the door of a motor vehicle and to the door frame is, of course, generally known: such elements do not, however, have any connection with this invention. In fact such elements, generally applied in correspondence with the vertical body frame member opposite the hinges and in certain cases even incorporated with door locks, have simply the object of preventing, during the running of the car on uneven roads, movements of the door relative to the surrounding part of the car body, to reduce vibrations, in particular vertical vibrations, of the door. For this purpose at least one of the elements is normally provided with a certain elasticity to ensure during the running of the vehicle continuous contact between the two interengaging elements.

BRIEF DESCRIPTION OF THE DRAWINGS

The invention will now be described, by way of non-limiting example, with reference to the enclosed schematic drawings, wherein.

DETAILED DESCRIPTION OF THE ILLUSTRATED EMBODIMENTS

Figure 1:
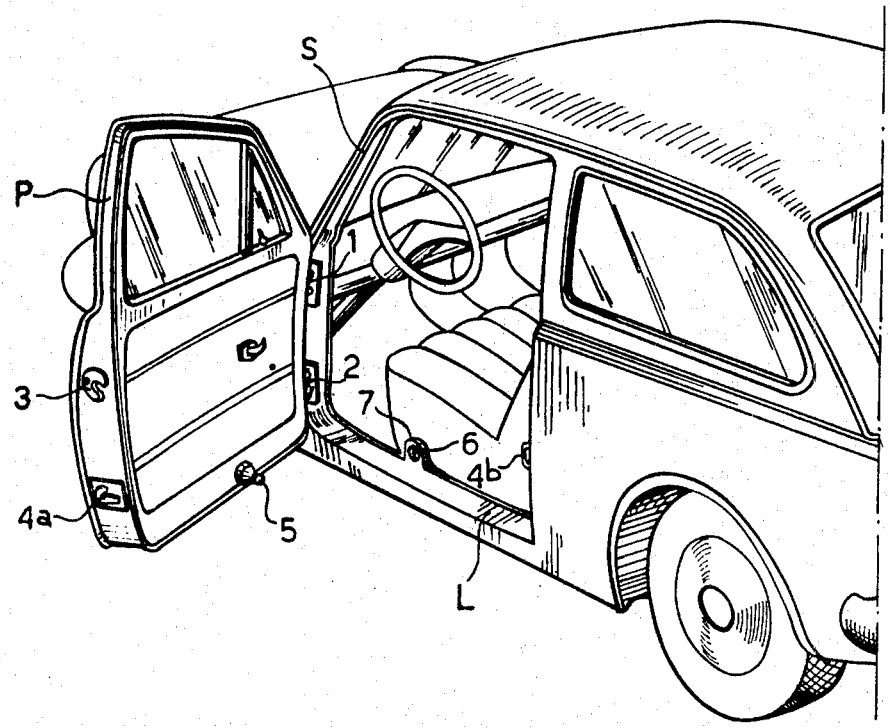
FIG. 1 is a partial perspective view of an automobile body provided with a side-collision resisting structure according to one embodiment of the invention, in which the interengageable elements are illustrated in a disengaged position.

Referring to FIG. 1, S indicates an automobile body having a door P provided with two hinges 1, 2 and with a three-dimensional lock 3 which ensures the longitudinal connection of the door P to the car body. The automobile body S has a longitudinally extending sill bar placed under the door, with sealing strips G1 and G2 attached respectively to the door P and the sill bar L. Two cooperating interengageable elements 4a and 4b are attached to the door P and to the car body respectively to further support the door P at its free edge opposite the hinges 1, 2 and eliminate vibrations.

Figure 2:
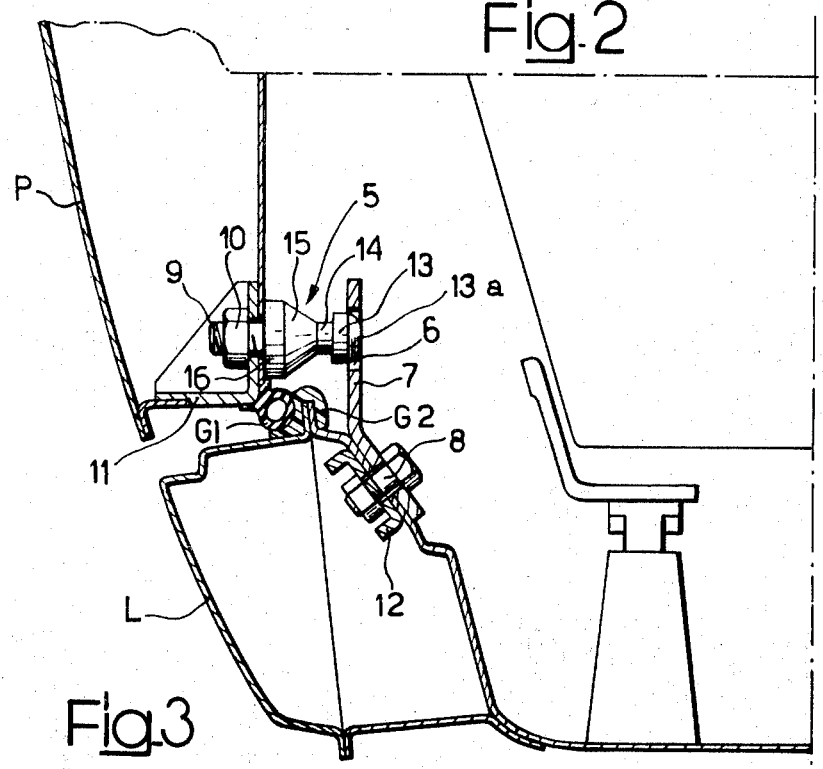
FIG. 2 is a transverse cross section on a larger scale of a door sill and the lower part of a door, illustrating the interengageable elements shown in FIG. 1 is an engaged position.

A stud 5 is fixed to the inside face of the door P near its lower edge, substantially in the centre of this edge. The stud 5 is adapted to engage in a hole 6 of a cooperating element 7 in the form of a plate attached to the sill bar L, in the closed position of the door, as illustrated in FIG. 2.

The plate element 7 is fixed by means of bolts 8 to the sill bar L, the latter being reinforced internally by a U-section strip 12 secured by the bolts 8. The stud 5 has a screw-threaded stem 9 which projects through a hole in the inside face of the door P and which is clamped thereto by a nut 10, the door P being reinforced in this region by an L shaped fillet 11.

The stud 5 has a cylindrical end portion 13 with a rounded end surface 13a and having a diameter slightly smaller than that of the hole 6 of the plate element 7, a cylindrical neck 14 of a diameter smaller than that of the end portion 13, and a frusto-conical base portion 15 interconnecting the neck 14 and a flange 16 which abuts the internal face of the door, and from which the said stem 9 projects.

The structure according to the invention functions in the following manner.

When the door P is closed only the end portion 13 of the stud 5 is engaged in the hole 6. In the event of a side collision on the door P the deformation of the door causes the frusto-conical base portion 15 to be forced into the hole 6 of the plate 7, thus effectively securing the door P to the sill bar L. In this way upwards flexion of the lower edge of the door P is prevented and the sheet-steel cladding of the door acts as a spring, reacting against a rigid U shaped structure formed by the front edge of the door P, secured to the car body S by the hinges 1, 2, by the lower edge of the door, made rigid by the connection of the door to the sill bar L described above, and by the rear edge of the door P, made rigid by the connection of the door L with the door frame of the car body S by means of the three dimensional lock 3 and the cooperating elements 4a, 4b. In this case the cooperating elements 4a, 4b should be of the two-dimensional type (that is, able to react in two directions) similar to the inter-engagement of the elements 5 and 7.

The sheet-steel of the door is therefore supported on three sides in the event of a side collision, braced by the tension in the steel sheet, and is therefore able to present its whole resistance, contrary to what happens in the known structures for door reinforcement consisting of flexion-resisting elements inter-connecting the hinges with the lock, which structures necessarily have a limit represented by the critical load beyond which the structure yields because of springy instability.

Furthermore, the neck 14 of reduced diameter serves to prevent the disengagement of the stud 5 from the plate element 7 in the case of abnormal oblique deformations.

The embodiment described with reference to FIGS. 1 and 2 lends itself to the adaptation of vehicles already in use. The embodiment illustrated in FIG. 3 illustrates a structure according to the invention which is aesthetically preferable for application to a vehicle during production and using component parts all made of pressed sheet steel.

Figure 3:
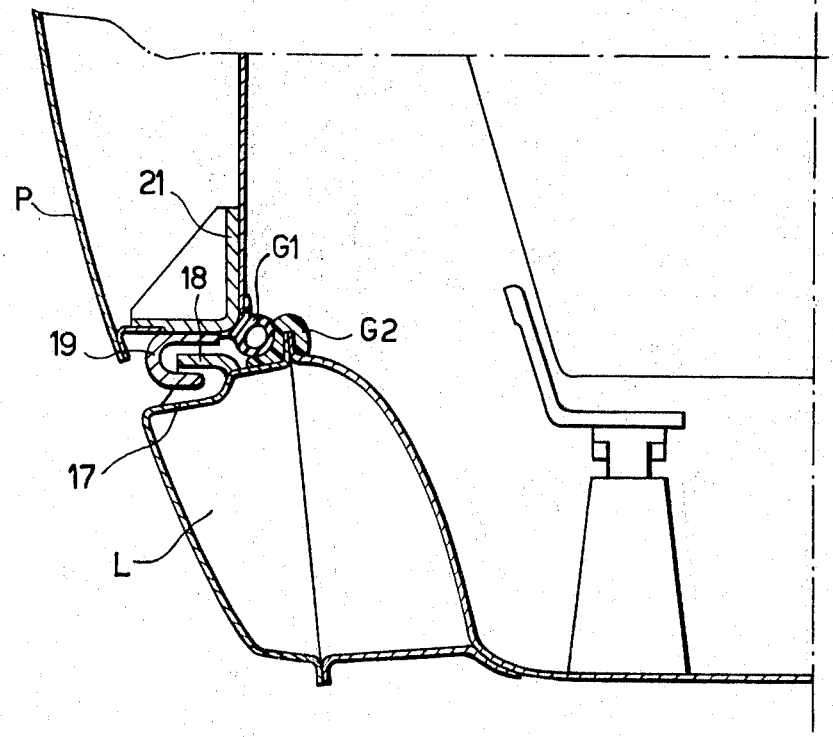
FIG. 3 is a transverse cross section similar to FIG. 2 showing a variant of the invention.

Referring to FIG. 3, the upper surface of the sill bar L is formed with at least one longitudinal rebate 17 formed by pressing. A laterally outwardly projecting longitudinally extending flange 18 is attached, for example by welding, to the sill bar L above the rebate 17, the flange 18 being substantially flat and horizontal. Under the lower edge of the door P, provided with an internal reinforcement fillet 21, at least one sheet steel element 19 of U-section is attached by welding and is adapted to engage, when the door is closed, in the channel formed between the rebate 17 and the flange 18. The device of FIG. 3 operates in the event of a side collision in a manner similar to the device described with reference to FIGS. 1 and 2 and does not therefore require a particular explanation. It will be apparent that the device according to FIG. 3 is, in contrast to that of FIGS. 1 and 2, arranged so as not to be visible from the inside or outside of the car body when the door is closed.

It will be understood that details of embodiments of the invention can be widely varied with respect to what has been described and illustrated merely by way of example, without departing from the spirit or scope of this invention.

I claim:

1. In a car body provided with at least one door hinged about a vertical axis and with a sill bar beneath the door, a side-collision resisting structure comprising at least two cooperating interengageable elements carried respectively by the lower edge of the door, substantially equidistantly from the ends of said edge, and by said sill bar; said interengageable element comprising a stud having a rounded end and a neck of reduced diameter and a plate having a hole adapted to receive the rounded end of said stud, said interengageable elements adapted to cooperate in the closed position of the door to prevent substantial relative displacement of said elements both in the vertically upward and in the horizontally inward direction with respect to the car body under the action of collision forces applied to the outside surface of the door.

* * * * *